United States Patent [19]
Rohder

[11] Patent Number: 5,802,672
[45] Date of Patent: Sep. 8, 1998

[54] WIRING DUCT END CAP

[76] Inventor: Brian K. Rohder, 3129 Joann Dr., Joliet, Ill. 60435

[21] Appl. No.: 752,102

[22] Filed: Nov. 20, 1996

[51] Int. Cl.[6] .............................. E05D 15/00; A47H 1/04
[52] U.S. Cl. ............................................... 16/95 R
[58] Field of Search ................... 16/95 R, 87 R, 16/87.4 R, 96 R, 96 D, 94 R, 94 D, 2.3, 2.4; 174/48, 49

[56] References Cited

U.S. PATENT DOCUMENTS

| | | | |
|---|---|---|---|
| 1,014,020 | 1/1912 | Miller | 16/95 R |
| 2,938,947 | 5/1960 | Ferris | 16/95 R |
| 4,864,686 | 9/1989 | Lasier et al. | 16/95 R |
| 5,090,644 | 2/1992 | Lenker | 174/153 G |
| 5,206,972 | 5/1993 | Nudelmont et al. | |
| 5,242,222 | 9/1993 | Michael | 16/95 R |

*Primary Examiner*—Chuck Mah
*Attorney, Agent, or Firm*—Mark D. Hilliard; Robert A. McCann; Michael J. Turgeon

[57] ABSTRACT

Device for enclosing an end of a wiring duct raceway including an end panel, a covering section and an anti-rotation mechanism. The end panel is adapted to cover the end of the raceway. However, the covering section extends from a portion of the edge of the end panel and has a cross-section slightly larger than the cross-section of the raceway. In order to prevent disengagement from the raceway, the anti-rotation mechanism uses a latching mechanism, while depending from the covering section.

24 Claims, 3 Drawing Sheets

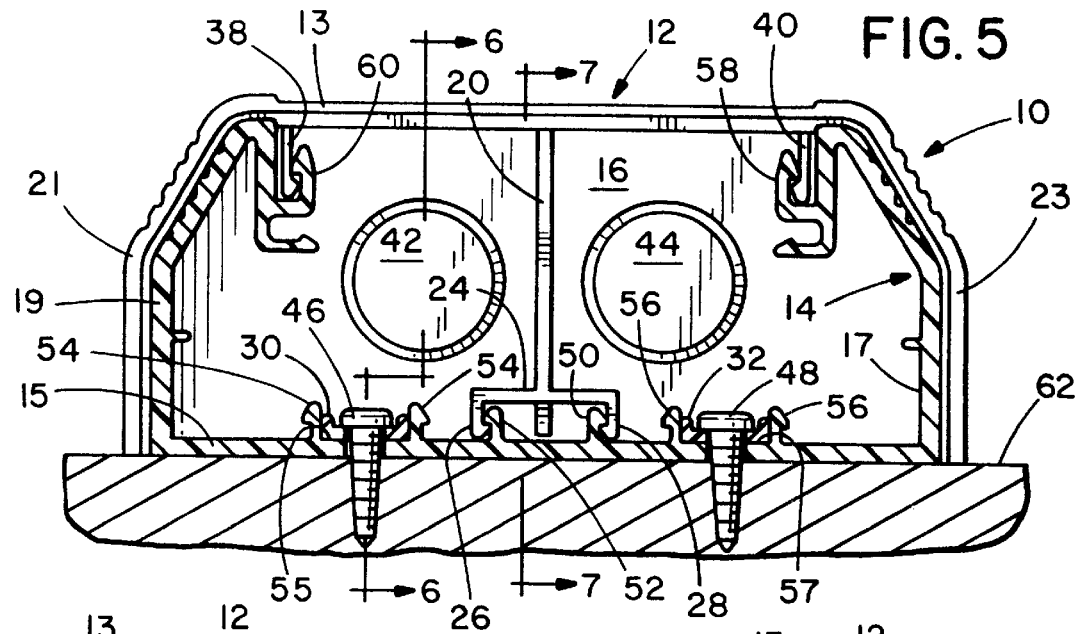
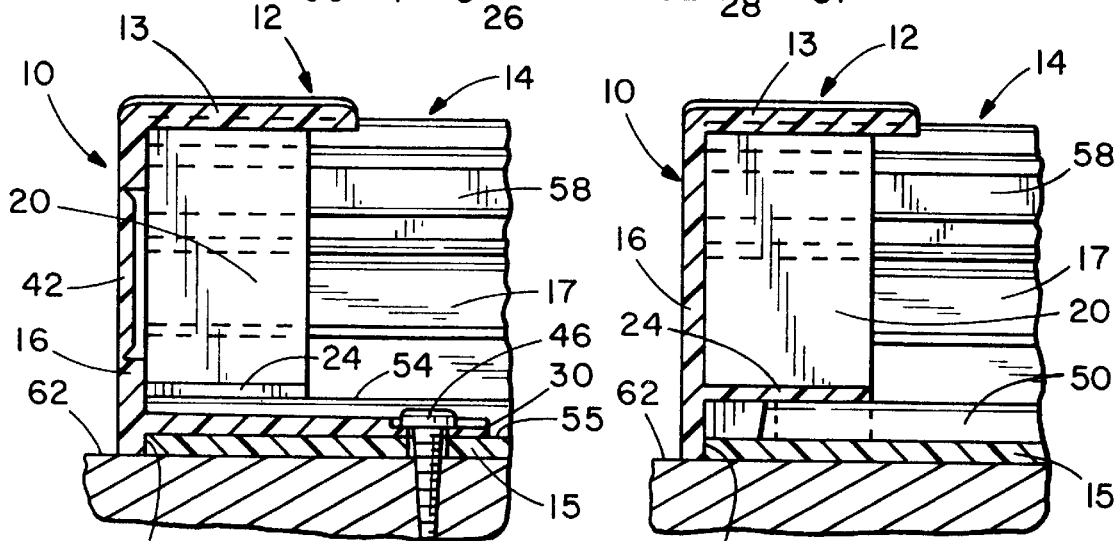
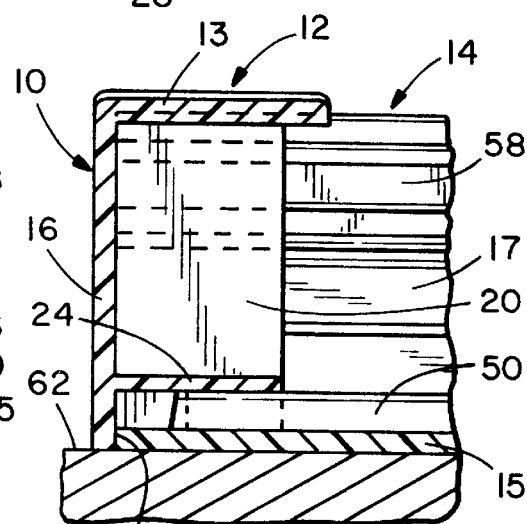
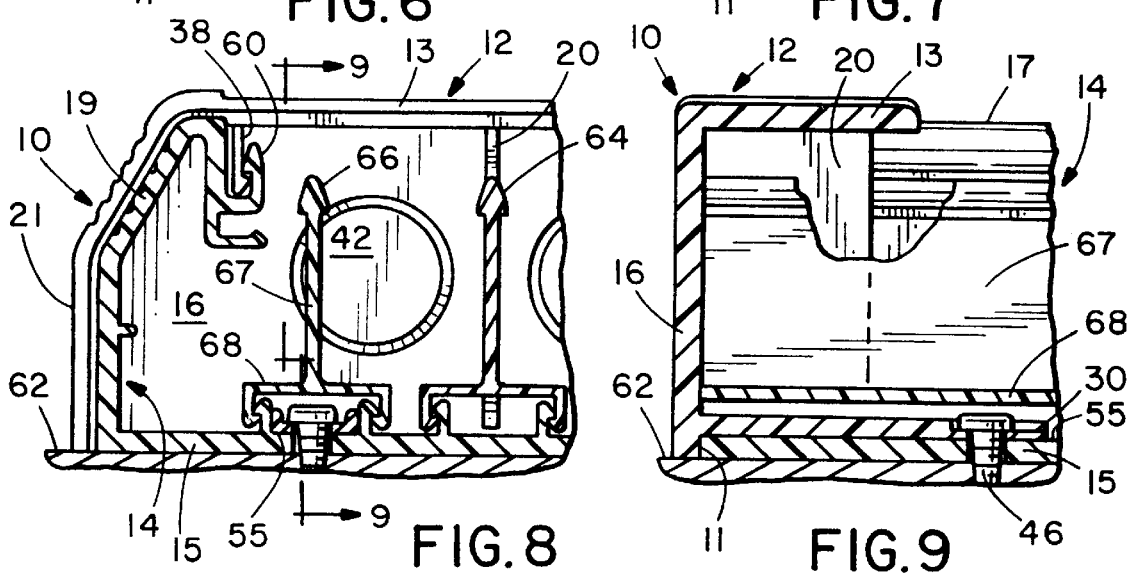
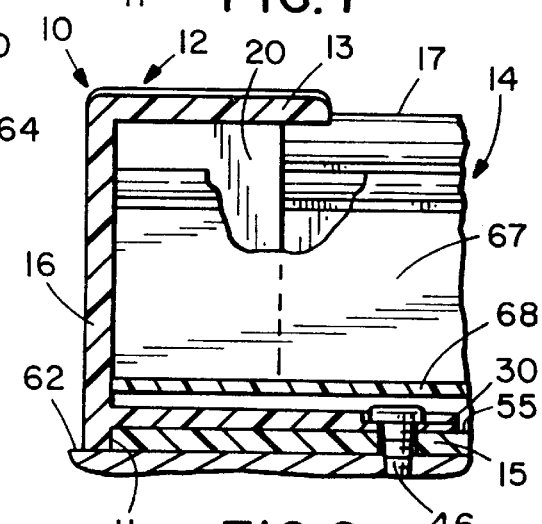
FIG. 5
FIG. 6
FIG. 7
FIG. 8
FIG. 9

WIRING DUCT END CAP

TECHNICAL FIELD

The present invention relates generally to wiring duct raceways used for communications systems, computer networks and electrical power systems where electrical power, fiber optic or other power and signal conductors are positioned in the raceways for their protection and to provide an accessible, orderly and aesthetically pleasing installation. Specifically, the present invention relates to an end cap for covering a termination point of such a raceway, which will remain where positioned when providing a connection between the raceway and a standard, conventional conduit attached thereto.

BACKGROUND OF THE INVENTION

A device for closing the end of a section of a wiring duct is known in the prior art from U.S. Pat. No. 5,206,972 to Nudelmont et al.

Using this end panel, with its multiple parts and engagement members presents a complicated and time-consuming solution of how to terminate a wiring duct to an installer. The many different members which engage the raceway allow for misalignment and operator error during assembly. While multiple parts allows a semi-permanent mounting, this approach creates problems when service is required on the wiring duct system. The opportunity for lost parts increases and therefore an incomplete re-assembly may be necessary. In addition, Nudelmont et al. does not provide a strain relief mechanism for when standard, conventional conduit is attached thereto.

Thus, there is a need in the art for a novel means and method of terminating a wiring duct raceway in a simple and effective manner which does not permit end cap rotation when standard, conventional conduit is attached thereto.

SUMMARY OF THE INVENTION

It is the object of the present invention to provide an improved termination device for a wiring duct raceway, a stable connection between a wiring duct raceway and a standard, conventional conduit, and a method of installing an end cap on a wiring duct raceway which permits an efficient and aesthetic raceway installation for power and signal conductors, compliance with safety requirements and exclusion of moisture, dust and other foreign bodies from the wiring duct raceway.

In one general form of the invention, an end cap which encloses the end of a wiring duct raceway includes an end panel which is sized according to the contours of the raceway and covers the axially exposed end of the raceway; a covering section which extends, as a flange, normal to a portion of the edge of the end panel, where the covering section, when installed, covers the sides of the raceway not contacting the support surface and has a cross-section slightly larger than the raceway cross-section, and an anti-rotation means depending from the covering section which prevents end cap rotation and disengagement from the raceway.

In general, the method of fitting an end cap for enclosing the end of a wiring duct raceway includes the steps of abutting the end panel of the end cap to the end of the raceway; aligning the covering section of the end cap over the end of the raceway, and snap-fitting the anti-rotation means of the end cap on to the raceway.

BRIEF DESCRIPTION OF THE DRAWINGS

FIG. 5 is a cross-sectional view showing an installed end cap of FIG. 1;

FIG. 6 is a fragmentary sectional view taken along lines 6—6 of FIG. 5;

FIG. 7 is a fragmentary sectional view taken along lines 7—7 of FIG. 5;

FIG. 8 is an enlarged fragmentary cross-sectional view showing an installed end cap of FIG. 1 with optional raceway divider walls installed in the wiring duct raceway; and FIG. 9 is a fragmentary sectional view taken along lines 9—9 of FIG. 8.

Description of the Preferred Embodiment

An end cap fitting embodying the concept of the present invention is designated by the numerical 10 in the accompanying drawings.

Figure 1:
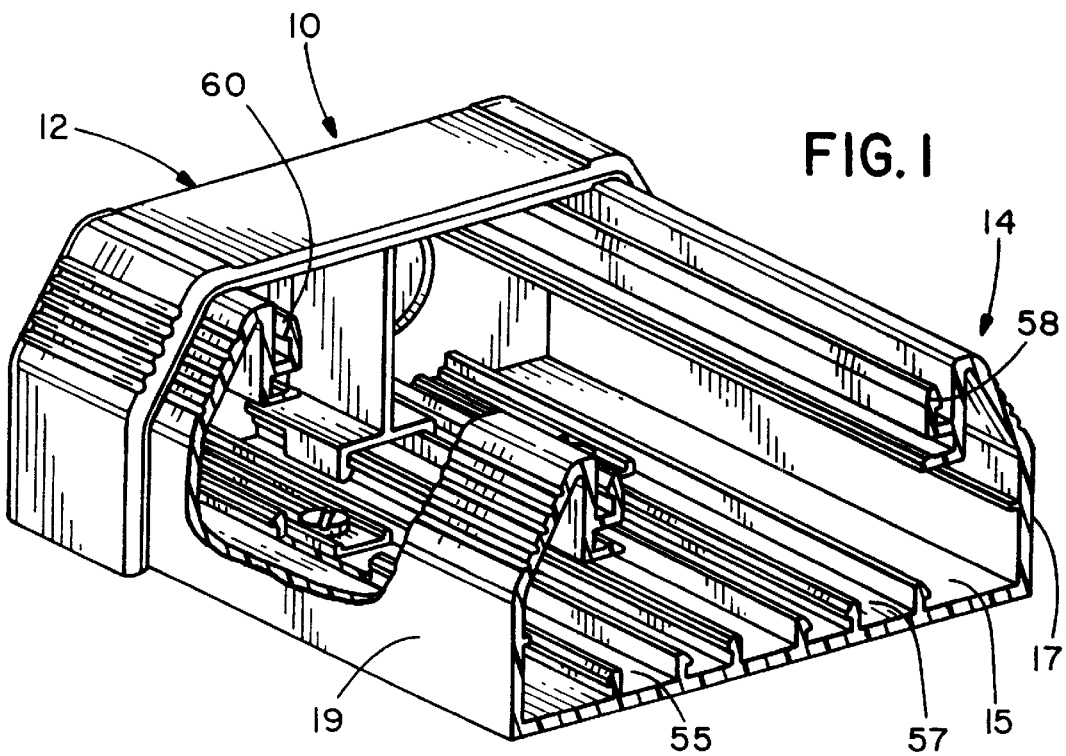
FIG. 1 is a perspective view of a wiring duct raceway and an end cap embodying the concept of the present invention.

As shown in FIG. 1, the end cap fitting 10 of the present invention cooperates with a wiring duct raceway 14. Both the end cap fitting 10 and the wiring duct raceway 14 are preferably formed from ABS or other similar resilient polymeric material and can be snapped together to form the assembly as shown in FIG. 1.

Figure 2:
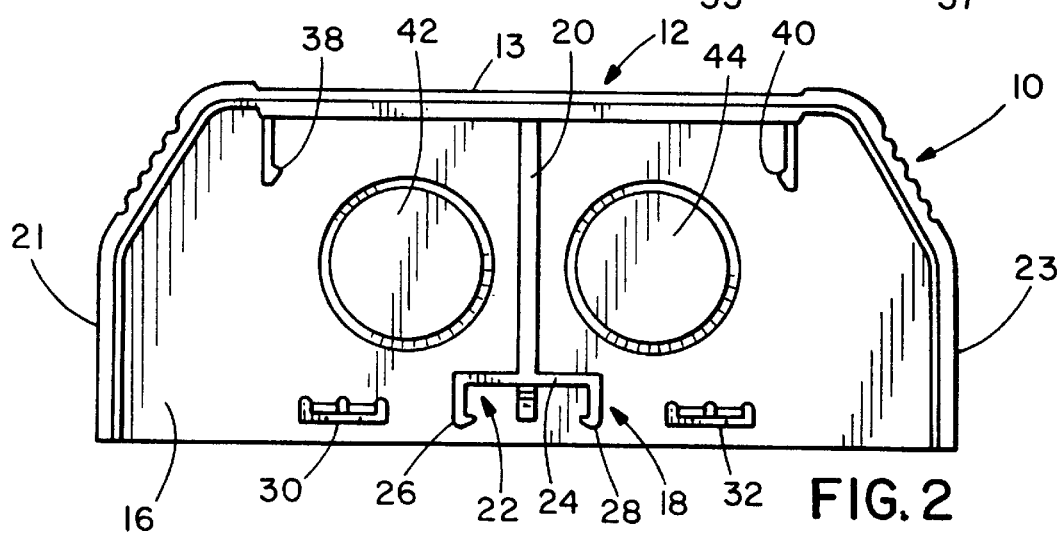
FIG. 2 is a front view of the end cap of FIG. 1.
Figure 3:
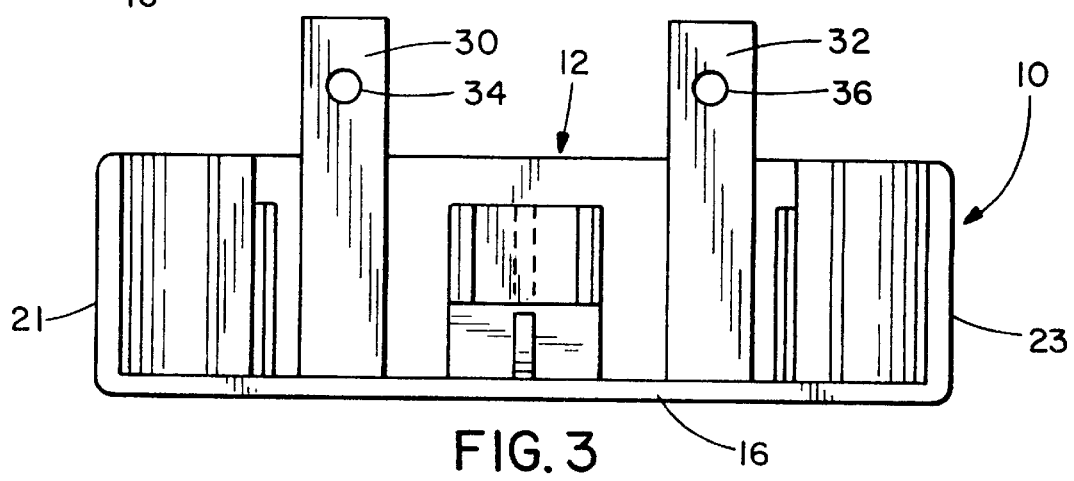
FIG. 3 is a bottom view of the end cap of FIG. 1.

As best shown in FIG. 2 and FIG. 3, the end cap fitting 10 includes an end panel 16 which is perpendicular to the raceway base 15, a covering section 12 which extends like a flange perpendicular to most of the end panel 16, and an anti-rotation mechanism 18 which depends from the covering section 12.

The end panel 16 provides the axial closure mechanism for the wiring duct raceway 14. Its size follows the general outline of the wiring duct raceway 14. The end panel 16 further includes mounting flanges 30 and 32, and conduit breakouts 42 and 44. The mounting flanges 30 and 32 extend perpendicularly from the end panel 16 a certain distance, and upon installation are received within mounting flange channels 55 and 57. The mounting flange channels 55 and 57 are formed between the distance separating each pair of outer divider wall latches 54 and 56. Apertures 34 and 36, which are contained in the mounting flanges 30 and 32, align with the raceway mounting apertures 59 and 61 to position the end cap fitting 10 accurately. Alignment of the apertures 34 and 36 with the raceway mounting apertures 59 and 61 will indicate complete axial engagement with the raceway and permits insertion of fasteners 46 and 48 which would engage a support surface 62. The efficiency of this type of engagement has not been disclosed in the prior art for wiring duct end caps.

The conduit breakouts 42 and 44 may be removed by any conventional method to provide a connection between the wiring duct raceway 14 and a standard, conventional conduit (not shown). This allows an installer to safely and neatly route the power or signal conductors out of the wiring duct raceway 14, where the wiring duct raceway 14 may not be required or permitted.

The covering section 12 extends from a portion the end panel 16, much like a flange. Included in the covering section 12 are a top covering section 13 and side covering sections 21 and 23. Preferably, these three sections are integrally formed and surround a portion of the wiring duct raceway 14, except for the raceway base 15. By surrounding the portion of the raceway 14 not contacting the support surface 62, the covering section 12 excludes moisture, dust and other foreign bodies from penetrating the wiring duct raceway. Secondary latching mechanisms 38 and 40 may depend from the top covering section 13 and cooperate with the raceway cover latches 58 and 60 to provide additional engagement for the end cap fitting 10 with the wiring duct raceway 14.

Depending from the covering section 12 is an anti-rotation mechanism 18 which includes a center stiffening rib 20 and attaches by way of a latching mechanism 22 to the center divider wall latches 50 and 52 of the raceway base 15, as best seen in FIG. 5. Such an attachment prevents the top covering section 13 from rotating outward, away from the wiring duct raceway 14, when a standard, conventional conduit (not shown) is installed in one of the conduit breakouts 42 or 44.

Figure 4:
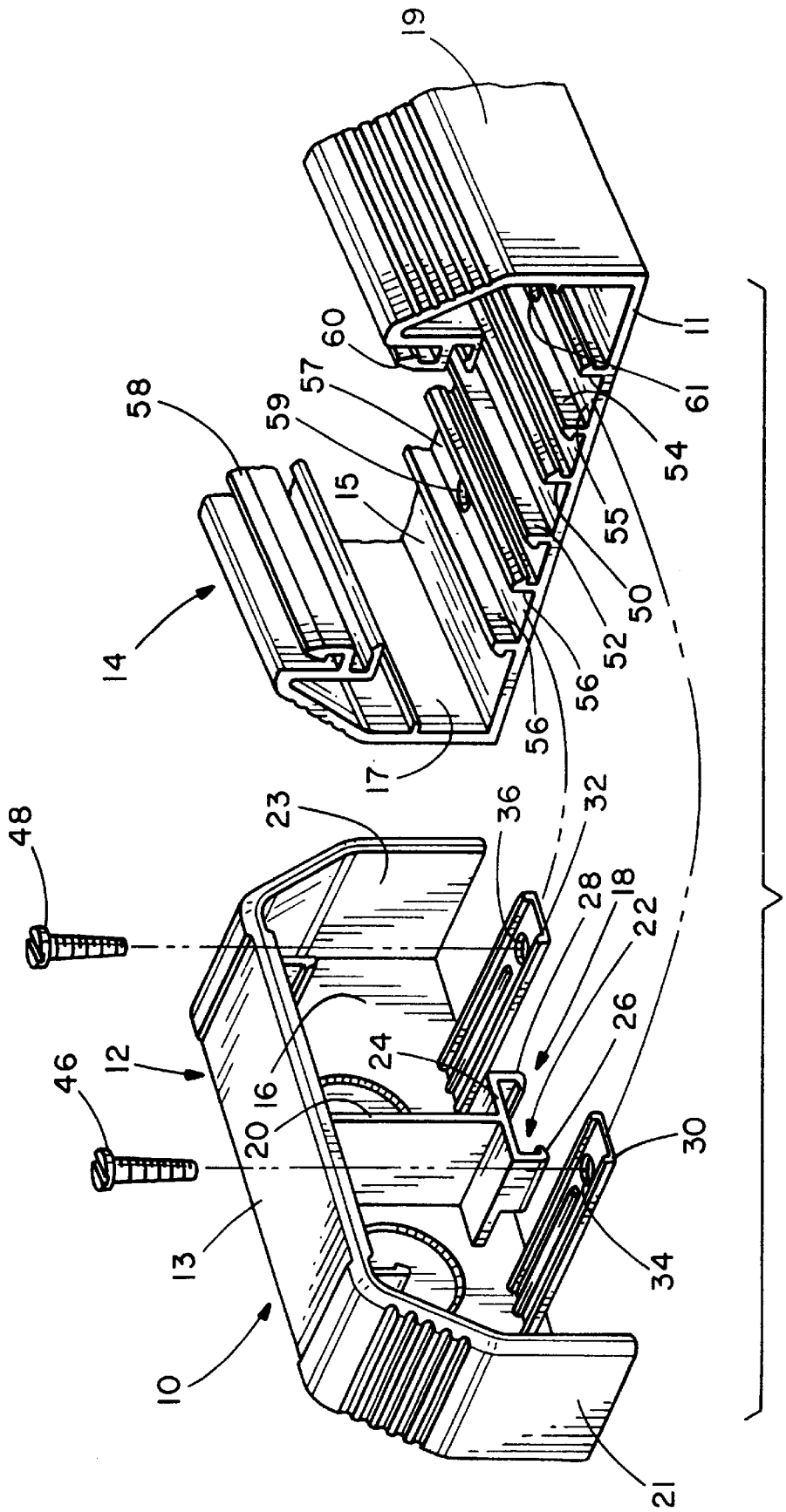
FIG. 4 is a partial exploded perspective view, broken away, showing a wiring duct raceway, and an end cap and fasteners embodying the concept of this invention.

The latching mechanism 22, as best seen in FIG. 2 and FIG. 5, includes a horizontal flange 24 located at the lowermost portion of the center stiffening rib 20, and a pair of latches 26 and 28 located at the distal ends of the horizontal flange 24. As previously mentioned, the latches 26 and 28 engage the center divider wall latches 50 and 52 to provide the primary positive engagement with the raceway base 15. Preferably, the center stiffening rib 20 and the horizontal flange 24 also extend from the end panel 16, as shown in FIG. 1 and FIG. 4. This construction provides torsional reinforcement for the end cap fitting 10 against twisting and bending.

In addition to the elements previously mentioned, a wiring duct raceway 14 may also include an optional center raceway divider wall 64 or optional outer raceway divider walls 66, as best seen in FIG. 8. All of the optional raceway divider walls 64 or 66 are of identical construction and interchangeable with each other. Each includes an upright member 67, a divider wall horizontal flange 68 and a divider wall latching mechanism 69. Addition of these optional raceway divider walls 64 or 66 allows the installer to customize each application or permits conformance with code requirements. However, if an outer raceway divider wall 66 is used when a standard, conventional conduit (not shown) is attached, the outer raceway divider wall 66 must be notched for clearance.

In operation, the method of the present invention is practiced by abutting the end panel 16 of the end cap fitting 10 to the raceway end 11; aligning the covering section 12 over the raceway end 11, and snap-fitting the anti-rotation means 18 onto the raceway base 15. Additional steps may include snap-fitting a secondary latching mechanism 38 and 40 onto the raceway cover latches 58 and 60 which depend from the top of the raceway sidewalls 17 and 19. Further steps may include positioning a mounting flange 30 and 32 within a mounting flange channel 55 and 57, affixing the end cap fitting 10 and the raceway 14 to a support surface 62 with a fastener 46 or 48, or opening a conduit breakout 42 or 44 in the end panel 16.

While the particular preferred embodiment of the present invention has been shown and described, it will be obvious to those skilled in the art that changes and modifications may be made without departing from the teachings of the invention.

What is claimed is:

1. A device for enclosing an end of a wiring duct raceway comprising:

an end panel adapted to cover the end of the raceway;

a covering section extending normal to a portion of an edge of the end panel;

the covering section having a cross-section slightly larger than the raceway cross-section; and anti-rotation means depending from the covering section for preventing disengagement of the device from the raceway.

2. The device of claim 1 wherein the anti-rotation means further comprises, a center stiffening rib depending from the covering section; and a latching means for providing positive engagement with the raceway;

wherein the latching means is attached to the lowermost portion of the center stiffening rib.

3. The device of claim 2 wherein the latching means further comprises, a horizontal flange;

wherein the horizontal flange has a latch at each distal end for providing positive engagement with the raceway.

4. The device of claim 3 wherein the center stiffening rib and the horizontal flange extend normal from the end panel.

5. The device of claim 1 wherein the end panel further comprises, at least one mounting flange extending normal to the end panel; and the at least one mounting flange has at least one positioning means for aligning the device when positioned at the end of the raceway.

6. The device of claim 5 wherein the at least one positioning means further comprises, at least one aperture.

7. The device of claim 1 wherein the end panel further comprises, at least one mounting flange extending normal to the end panel; and the at least one mounting flange has at least one mounting means for securing the device and the raceway.

8. The device of claim 7 wherein the at least one mounting means further comprises, at least one aperture; and at least one fastener.

9. The device of claim 1 wherein the covering section further comprises, at least one secondary latching means depending from the covering section for engagement with the raceway.

10. The device of claim 1 wherein the end panel further comprises, at least one conduit breakout adapted for providing connection between the raceway and a conduit.

11. A device for enclosing an end of a wiring duct raceway comprising:

an end panel adapted to cover the end of the raceway;

a covering section extending normal to a portion of an edge of the end panel;

the covering section having a cross-section slightly larger than the raceway cross-section; and a latching means depending from the covering section for providing positive engagement with the raceway.

12. The device of claim 11 wherein the latching means further comprises, a center stiffening rib depending from the covering section;

a horizontal flange;

wherein the horizontal flange is attached to the lowermost portion of the center stiffening rib; and wherein the horizontal flange has a latch at each end thereof for providing positive engagement with the raceway.

13. The device of claim 12 wherein the center stiffening rib and the horizontal flange extend normal from the end panel.

14. The device of claim 11 wherein the end panel further comprises, at least one mounting flange extending normal to he end panel; and the at least one mounting flange has at least one positioning means for aligning the device when positioned at the end of the raceway.

15. The device of claim 14 wherein the at least one positioning means further comprises, at least one aperture.

16. The device of claim 11 wherein the end panel further comprises, at least one mounting flange extending normal to the end panel; and the at least one mounting flange has at least one mounting means for securing the device and the raceway.

17. The device of claim 16 wherein the at least one mounting means further comprises, at least one aperture; and at least one fastener.

18. The device of claim 11 wherein the covering section further comprises, at least one secondary latching means depending from the covering section adapted for engagement with the raceway.

19. The device of claim 11 wherein the end panel further comprises, at least one conduit breakout adapted for providing connection between the raceway and a conduit.

20. A method of fitting a device for enclosing an end of a wiring duct raceway comprising the steps of:

abutting an end panel of the device to the end of the raceway;

aligning a covering section of the device, which extends normal to a portion of an edge of the end panel and has a cross-section slightly larger than the raceway cross-section, over the end of the raceway; and snap-fitting an anti-rotation means of the device, which depends from the covering section, onto the raceway.

21. The method of claim 20 further comprising the step of:

snap-fitting a secondary latching means of the device, which depends from the covering section, onto the raceway.

22. The method of claim 20 further comprising the steps of:

positioning an at least one mounting flange, which extends normal to the end panel, within a mounting flange channel of the raceway; and affixing the device and the raceway to a support surface with at least one fastener therethrough.

23. The method of claim 21 further comprising the steps of:

positioning an at least one mounting flange, which extends normal to the end panel, within a mounting flange channel of the raceway; and affixing the device and the raceway to a support surface with at least one fastener therethrough.

24. The method of claim 20 further comprising the step of:

removing a conduit breakout in the end panel of the device.

* * * * *